US012502693B2

(12) United States Patent
Bradley et al.

(10) Patent No.: US 12,502,693 B2
(45) Date of Patent: Dec. 23, 2025

(54) BACKFLUSH SEAL CLEANING APPARATUS

(71) Applicant: Applied Materials, Inc., Santa Clara, CA (US)

(72) Inventors: Benjamin Clay Bradley, Whitefish, MT (US); Ryan Michael Thompson, Kila, MT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/471,190

(22) Filed: Sep. 20, 2023

(65) Prior Publication Data

US 2025/0091094 A1 Mar. 20, 2025

(51) Int. Cl.

| | |
|---|---|
| ***B08B 1/00*** | (2024.01) |
| ***B08B 1/10*** | (2024.01) |
| ***B08B 3/08*** | (2006.01) |
| *B08B 9/02* | (2006.01) |
| *C25D 17/00* | (2006.01) |

(52) U.S. Cl.
CPC .................. *B08B 1/10* (2024.01); *B08B 3/08* (2013.01); *B08B 9/021* (2013.01); *C25D 17/004* (2013.01)

(58) Field of Classification Search
CPC .. B08B 1/10; B08B 3/08; B08B 9/021; C25D 17/004
See application file for complete search history.

(56) References Cited

U.S. PATENT DOCUMENTS

| | | | | |
|---|---|---|---|---|
| 5,816,900 A * | 10/1998 | Nagahara | B24B 57/02 451/60 |
| 6,296,557 B1 * | 10/2001 | Walker | B24B 37/26 451/526 |
| 2001/0012751 A1 * | 8/2001 | Boyd | B24B 37/042 451/41 |
| 2002/0072307 A1 * | 6/2002 | Fruitman | B24D 3/28 451/36 |
| 2003/0003850 A1 * | 1/2003 | Eaton | B24B 37/16 451/41 |
| 2008/0041725 A1 * | 2/2008 | Klein | C23F 1/02 204/640 |

* cited by examiner

*Primary Examiner* — Benjamin L Osterhout
(74) *Attorney, Agent, or Firm* — Kilpatrick Townsend & Stockton LLP

(57) ABSTRACT

Exemplary seal cleaning apparatuses may include at least one support that is configured to receive a seal. The apparatuses may include a tool arm that is positionable within an interior of the seal. The apparatuses may include a pad holder that is rotatably coupled with the tool arm. The pad holder may include a body having a first end and a second end. The first end may define a channel that is configured to receive a cleaning pad. The body may define an aperture that extends from the second end through the channel. The pad holder may include a fluid fitting coupled with the aperture at the second end of the body. The apparatuses may include a cleaning fluid source that is fluidly coupled with the fluid fitting.

10 Claims, 4 Drawing Sheets

BACKFLUSH SEAL CLEANING APPARATUS

TECHNICAL FIELD

The present technology relates to methods, components, and apparatuses for semiconductor manufacturing. More specifically, the present technology relates to cleaning apparatuses for seals used in semiconductor processing operations.

BACKGROUND

During the manufacture of semiconductor devices, many processing steps may be performed in which it is desirable to seal the peripheral edge of a semiconductor wafer from the processing operations. Sealing the peripheral edge of the wafer may serve multiple purposes. For example, such sealing may prevent process chemistry from depositing and/or etching features on the peripheral edge of the wafer. This may help protect certain features formed on the wafer, such as electrical contacts, by preventing the features from being impacted by deposition, etching, plating, and/or other processing operations. Additionally, such sealing may prevent the process chemistry from reaching internal components of a processing device that are behind the seal. Over time, deposits from the process chemistry may build up on the seal, which may degrade the seal or contaminate subsequently processed wafers.

Thus, there is a need for improved systems and methods that can be used to effectively clean seals. These and other needs are addressed by the present technology.

SUMMARY

Exemplary seal cleaning apparatuses may include at least one support that is configured to receive a seal. The apparatuses may include a tool arm that is positionable within an interior of the seal. The apparatuses may include a pad holder that is rotatably coupled with the tool arm. The pad holder may include a body having a first end and a second end. The body may define an aperture that extends from the second end through the first end. The pad holder may include a fluid fitting coupled with the aperture at the second end of the body. The apparatuses may include a cleaning fluid source that is fluidly coupled with the fluid fitting.

In some embodiments, the apparatuses may include a holder mount that couples the pad holder with the tool arm. The holder mount may include a mounting portion that is coupled with the tool arm and a receiving portion that extends from the mounting portion. The receiving portion may define an aperture that receives the body of the pad holder. The first end of the body may include a first prong and a second prong that are spaced apart by a channel. The aperture may extend through the channel. The apparatuses may include the cleaning pad. The cleaning pad may extend over the first prong and the second prong and is suspended over the channel. The cleaning pad may be secured to the pad holder by being compressed between a wall of the aperture and an outer surface of the body. A gap between the outer surface of the body and the wall of the aperture may be less than about 0.5 mm. The pad holder may include a mating flange that extends radially outward from the body. The apparatuses may include a motor that is configured to rotate the at least one support relative to the tool arm.

Some embodiments of the present technology may encompass pad holders. The pad holders may include a body having a first end and a second end. The first end may define a channel that is configured to receive a cleaning pad. The body may define a fluid lumen having an inlet and an outlet. The outlet may extend through the channel. The pad holders may include a fluid fitting coupled with the inlet of the fluid lumen.

In some embodiments, the inlet of the fluid lumen may extend through the second end of the body. The first end of the body may include a first prong and a second prong that are spaced apart by the channel. The channel may extend across an entire width of the first end of the body. The pad holders may include a mounting flange extending radially outward from the body. The mounting flange may define a plurality of fastener apertures. The mounting flange may be disposed at the second end of the body. A diameter of the fluid lumen may be at least 2 mm.

Some embodiments of the present technology may encompass methods of cleaning a seal. The methods may include positioning a front surface of a cleaning pad against an edge of a seal. The cleaning pad may be secured with a pad holder. The methods may include delivering a cleaning solution through a body of the pad holder to a rear surface of the cleaning pad. In some embodiments, the methods may include rotating the seal relative to the cleaning pad. Positioning the front surface of the cleaning pad against the edge of the seal may include rotating an end of a tooling arm to position the pad holder alongside the edge of the seal. The cleaning solution may include deionized water.

Such technology may provide numerous benefits over conventional systems and techniques. For example, embodiments of the present technology may provide pad holders that enable cleaning pads to better clean surfaces of a seal. More particularly, the pad holders may facilitate delivery of a cleaning solution to a rear surface of the cleaning pad to better saturate the cleaning pad. Along with improving the cleaning ability of the cleaning pad, the cleaning solution may help lubricate the interface between the cleaning pad and the seal, which may reduce wear and increase an operational life of the cleaning pad. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Figure 1:
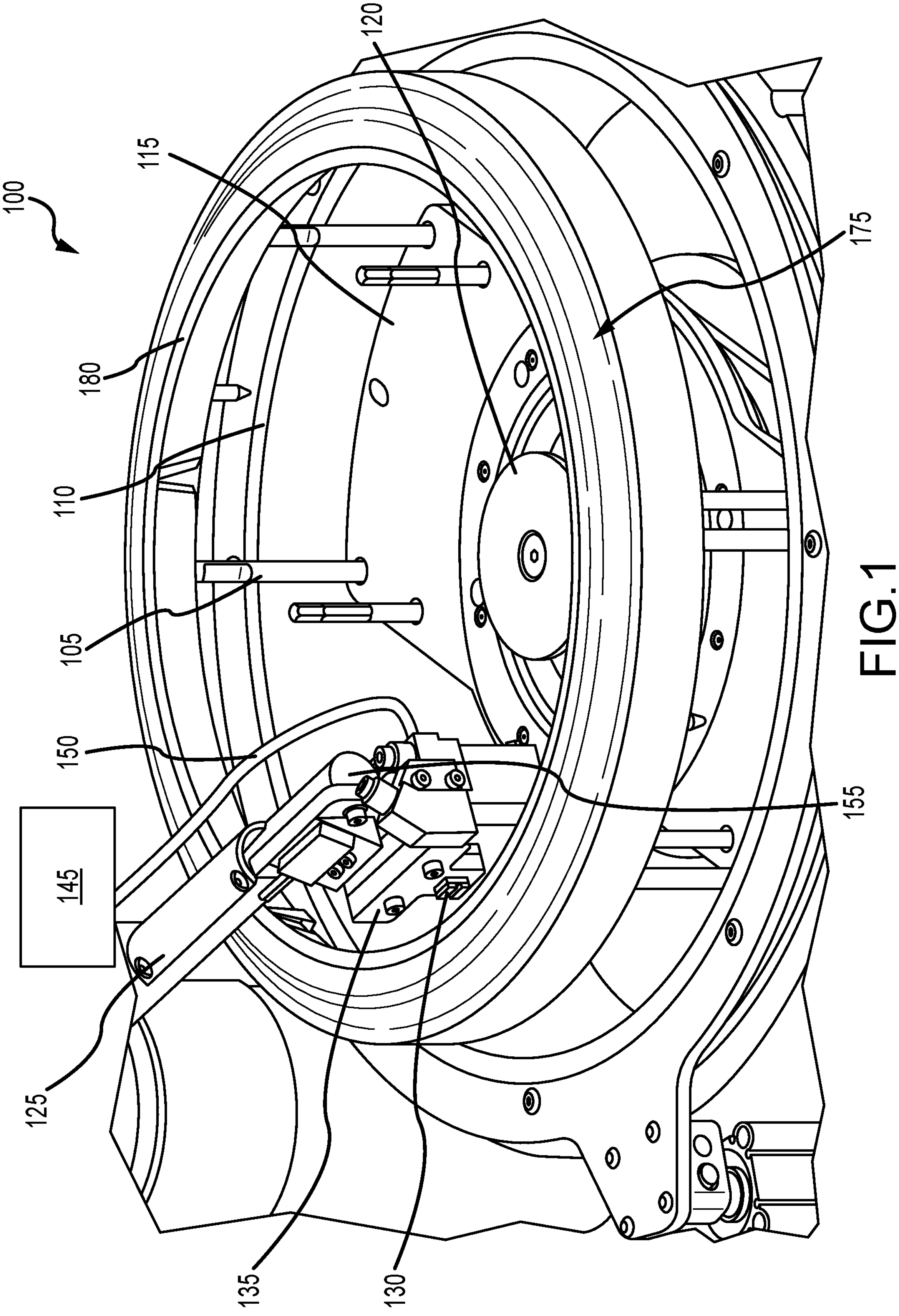
FIG. 1 shows a partial isometric view of an exemplary seal cleaning apparatus according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

In many semiconductor processing applications it may be desirable to prevent process chemistry from coming into contact with a peripheral edge of a wafer and/or a support components beneath the wafer. For example, the peripheral edge may include features such as electrical contacts that should not be covered with film, etched, plated, and/or otherwise processed. To protect such features, the wafer may be positioned within a seal that may contact an upper surface of the wafer and create an airtight and/or liquid tight seal that prevents process chemistry from contacting the peripheral edge of the wafer or from otherwise passing beyond the seal. This may be done in various processing operations, including deposition, etch, and/or plating operations. As just one example, a wafer holder of an electrochemical plating apparatus may include a seal that prevents the peripheral edge of the wafer from coming into contact with a liquid electrolyte and thereby prevents any material from being plated atop the peripheral edge of the wafer. While such seals are effective at preventing unwanted effects on the peripheral edge of the wafer, over time the process chemistry may form residues or other deposits on a surface the seal itself. Such residue may degrade the material of the seal and shorten the seal's lifespan and/or may contaminate subsequently processed wafers. To address these issues, conventional systems incorporate seal cleaning apparatuses that include cleaning pads that may periodically wipe the seals clean of any deposited material. To help enhance the cleaning, a cleaning solution may be applied to the seal surface prior to being wiped. However, conventional seal cleaning apparatuses apply the cleaning solution directly to the seal, which enables a large runoff of the solution and may prevent the cleaning pad from becoming saturated with the solution. This leads to a waste of the cleaning solution, as well as less effective cleaning of the seal surface and additional wear of the seal and cleaning pads.

The present technology overcomes these challenges by incorporating pad holders that enable the cleaning solution to be directly introduced to the cleaning pad. Direct introduction of the cleaning solution to the cleaning pad may provide better saturation of the cleaning pad, which may enhance the ability of the cleaning pad to remove deposits from the surface of the seal. Additionally, the saturation of the cleaning pad may better lubricate the interface between the cleaning pad and seal, which may reduce wear of the cleaning pad and/or seal and prolong the operational life of each component. Accordingly, the present technology may improve the seal cleaning effectiveness, prolong the lifespan of the seal and cleaning pad, and reduce waste of consumable components.

Although the remaining disclosure will routinely identify specific cleaning processes utilizing the disclosed technology, it will be readily understood that the systems and methods are equally applicable to other cleaning systems, as well as processes as may occur in the described systems. Accordingly, the technology should not be considered to be so limited as for use with these specific plating processes or systems alone. The disclosure will discuss one possible system that may include electroplating components according to embodiments of the present technology before additional variations and adjustments to this system according to embodiments of the present technology are described.

FIG. 1 illustrates an exemplary seal cleaning apparatus 100 that may be used to clean surfaces of seals, such as seal 175. Seal 175 may be annular in shape and may include an inner edge 180 that defines an open interior of seal 175. Inner edge 180 may include a downward-protruding rim (not shown) that may be positioned against a top surface of a substrate to create an edge exclusion zone for a given processing operation. Inner edge 180 and/or the downward-protruding rim may be cleaned by cleaning apparatus 100 in some embodiments.

Cleaning apparatus 100 may include at least one support 105 that is configured to receive seal 175. For example, each support 105 may be positioned against an underside and/or lateral surface of seal 175 to elevate seal 175 relative to a rinse basin 110. Rinse basin 110 may be disposed below and extend radially beyond seal 175 and may collect excess cleaning fluid during seal cleaning operations. Each support 105 may be disposed within rinse basin 110 and may extend above a top surface of rinse basin 110 in some embodiments. Supports 105 may be mounted on a rotating plate 115 that is disposed within rinse basin 110. Rotating plate 115 may be disposed above a bottom surface of rinse basin 110 and may be rotatable relative to rinse basin 110. For example, rotating plate 115 may be coupled with a motor 120 and/or other actuator that may cause rotating plate 115 to rotate relative to rinse basin 110. When seal 175 is seated atop supports 105, rotation of supports 105 causes seal 175 to rotate about rinse basin 110.

Cleaning apparatus 100 may include a tool arm 125 that is positionable above rinse basin 110 and/or within an interior of seal 175. For example, tool arm 125 may pivot, telescope, or otherwise move between a position in which all of tool arm 125 is disposed radially outward of seal 175 and/or rinse basin 110 and a position in which at least a distal end of tool arm 125 is disposed within the interior of seal 175, such as at a position within rinse basin 110 that is radially inward of supports 105. A pad holder 130 may be coupled with the distal end of the tool arm 125. Pad holder 130 may be configured to releasably secure a cleaning pad that may be positioned against inner edge 180 of seal 175 to wipe deposits from a surface of seal 175. In some embodiments, pad holder 130 may be coupled with tool arm 125 via a holder mount 135. For example, holder mount 135 may define an aperture that receives a body of pad holder 130. Holder mount 135 and pad holder 130 may work in conjunction with one another to secure a cleaning pad (not shown) to tool arm 125 for cleaning seal 175. For example, the cleaning pad may be secured to pad holder 130 by being compressed between an outer surface of pad holder 130 and a wall of the aperture of holder mount 135, without the use of any adhesives, fasteners, and/or other coupling mechanisms.

Pad holder 130 and/or holder mount 135 may be rotatably coupled with tool arm 125. For example, the distal end of tool arm 125 may include an actuator 155 that may maneuver between a retracted position and a cleaning position. Actuator 155 may be coupled with pad holder 130 and/or holder mount 135 such that movement of actuator 155 causes a corresponding movement of pad holder 130 and/or holder mount 135. Actuator 155 may be configured to rotate between the two positions. In the retracted position, holder mount 135 and pad holder 130 may be positioned at a height that is above seal 175 (and top ends of supports 105) when seal 175 is seated atop supports 105. This may provide clearance for tool arm 125 to move between a position that is outside rinse basin 110 (e.g., to enable seal 175 to be transferred to and from supports 105) and a position in which a distal end of tool arm 125 is disposed within the interior of seal 175. In the cleaning position, holder mount 130 and pad holder 130 may be positioned such that a cleaning pad supported by pad holder 130 is disposed in vertical alignment with inner edge 180 of seal 175, which may enable the cleaning pad to be moved into engagement with inner edge 180 of conformal pad 200. For example, tool arm 125 may be configured to move horizontally, such as by pivoting or rotating about an axis, which may enable tool arm 125 to laterally move a cleaning pad secured against pad holder 130 into engagement with inner edge 180 of seal 175 once actuator 155 has been moved to the cleaning position.

Cleaning apparatus 100 may include a cleaning fluid source 145 that may deliver a cleaning fluid to the cleaning pad and/or seal 175. For example, as will be discussed in greater detail below, pad holder 130 may define a fluid lumen that is fluidly coupled with a fluid fitting or other port. One or more cleaning fluid lines 150 may be fluidly coupled with pad holder 130 via the fluid fitting. The fluid lumen may route the cleaning fluid to a rear surface of the cleaning pad to saturate the cleaning pad for more effective cleaning of seal 175 and to better lubricate the interface between the cleaning pad and seal 175. In some embodiments, additional fluid lines may be included to deliver a volume of the cleaning fluid directly to the surface of seal 175, such as at angular locations before and/or after the cleaning pad. Cleaning fluid source 145 may flow cleaning fluid at rates of between about 3 mL/min and 1000 mL/min, between 100 mL/min and 800 mL/min, or between 200 mL/min and 600 mL/min.

In operation, a cleaning pad may be secured to pad holder 130 and seal 175 may be seated atop supports 105. Tool arm 125 may be maneuvered to a position in which at least a distal end of tool arm 125 is disposed within the interior of seal 175. Actuator 155 may be moved to the cleaning position in which a cleaning pad supported by pad holder 130 is disposed in vertical alignment with inner edge 180 of seal 175. Tool arm 125 may then be maneuvered laterally to engage the cleaning pad with inner edge 180 of seal 175. Before, during, and/or after engagement of the cleaning pad with inner edge 180 of seal 175, a cleaning solution may be flowed (such as via cleaning fluid lines 150) from cleaning fluid source 145 to the fluid fitting of pad holder 130 for delivery to a rear surface of the cleaning pad. Before, during, and/or after engagement of the cleaning pad with inner edge 180 of seal 175, motor 120 may be actuated to rotate rotating plate 115 and supports 105, which may cause seal 175 to rotate relative to the cleaning pad. The rotation of seal 175 may enable the cleaning pad to wipe against and clean an entire circumference of inner edge 180 of seal 175.

Figure 2A:
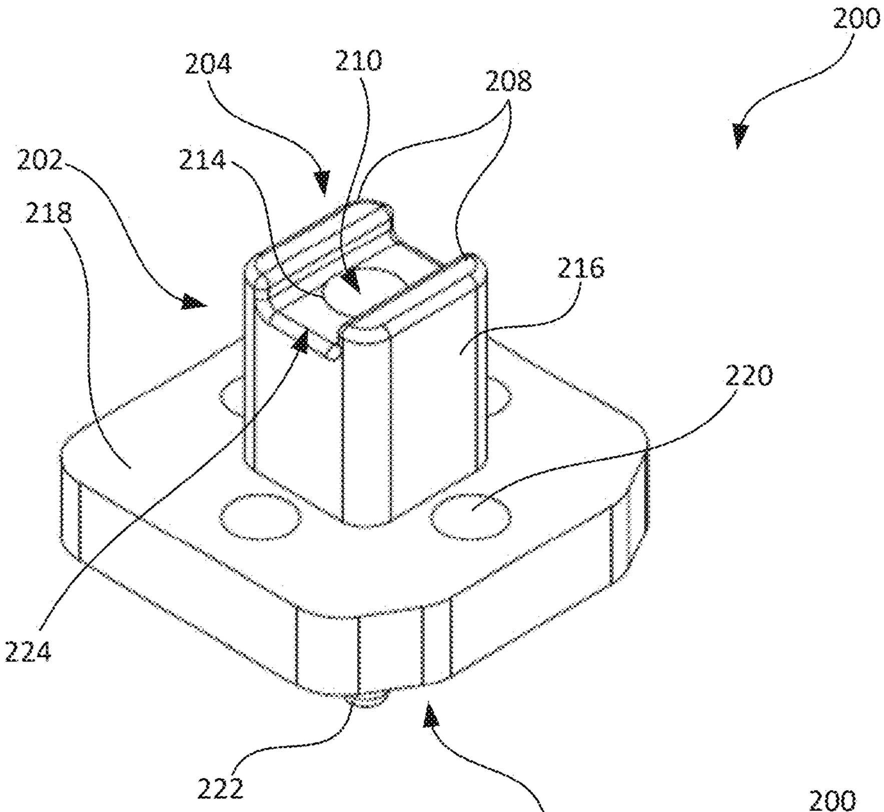
FIG. 2A shows a top isometric view of a pad holder according to some embodiments of the present technology.
Figure 2B:
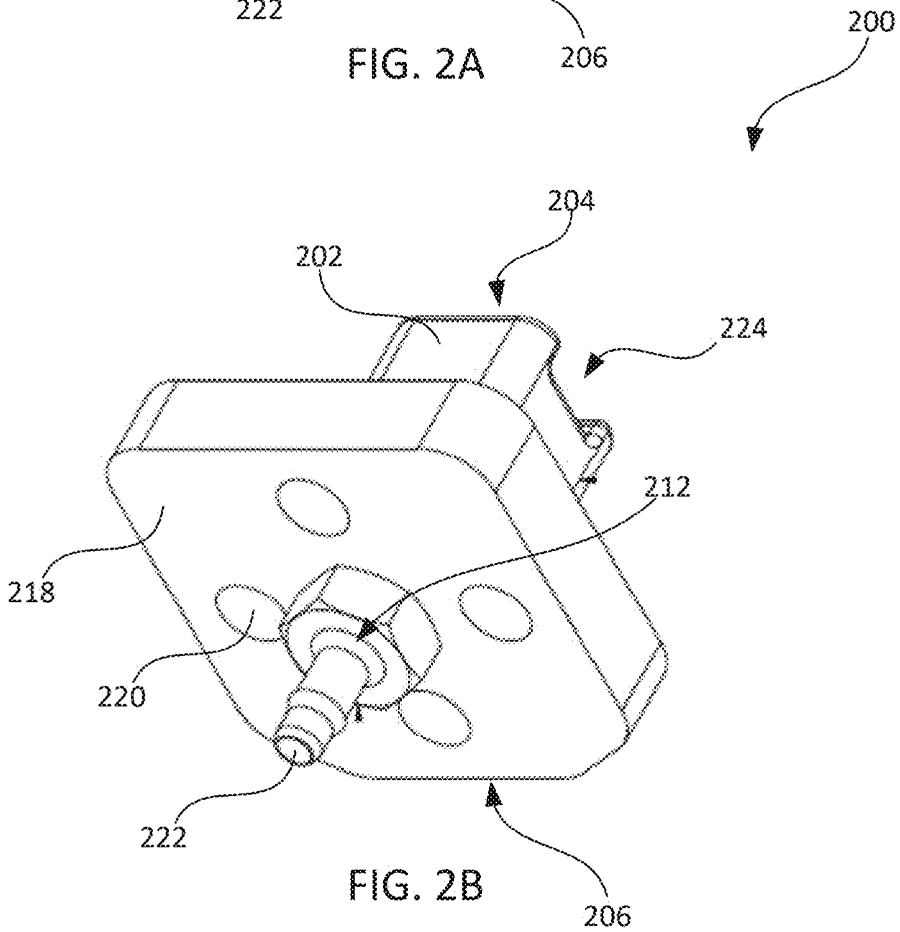
FIG. 2B shows a bottom isometric view of the pad holder of FIG. 2A.

FIGS. 2A and 2B illustrate one embodiment of a pad holder 200 in accordance with the present invention. Pad holder 200 may be used in a cleaning system, such as cleaning apparatus 100. For example, pad holder 200 may be used as pad holder 130 and may include any of the features described in relation to pad holder 130. Pad holder 200 may include a body 202 that may include a first end 204 and a second end 206. Body 202 may have a generally rectangular cross-section as illustrated here (e.g., a square or other rectangular shape with rounded corners) and/or may have another cross-sectional shape (e.g., circle, polygon, etc.). First end 204 of body 202 may define a channel 224 that may be configured to receive a cleaning pad as will be discussed in greater detail with respect to FIGS. 3 and 4. For example, first end 204 of body 202 may include two prongs 208 that are spaced apart by channel 224. Channel 224 may be sized and shaped to receive a portion of a cleaning pad when a portion of a seal (such as inner edge 180 of seal 175) is positioned against the cleaning pad. For example, in some embodiments channel 224 may be generally U-shaped, with sharp, angled, and/or rounded corners (e.g., at a base of each prong 208). Channel 224 may extend across an entire width of first end 204 of body 202. A width of channel 224 may be larger than a thickness of an inner edge of the seal being cleaned, which may enable the inner edge of the seal to be inserted within channel 224 to deform the cleaning pad to enable the cleaning pad to conform to the contours of the inner edge of seal. When in the cleaning position, channel 224 may be oriented horizontally to enable channel 224 to receive the inner edge of the seal.

Body 202 may define an aperture or fluid lumen 210, which may include an inlet 212 and an outlet 214. Outlet 214 may extend through channel 224 and may enable a fluid delivered to fluid lumen 210 to be dispensed to a rear surface of a cleaning pad that is secured to pad holder 200. Inlet 212 may extend through another surface of body 202, such as a lateral surface 216 extending between first end 204 and second end 206. In the illustrated embodiment, inlet 212 extends through second end 206, with inlet 212 being opposite outlet 214 such that fluid lumen 210 forms a linear flow path through body 202. It will be appreciated that in other embodiments fluid lumen 210 may include non-linear flow paths, such as curved flow paths and/or flow paths formed from one or more segments that are at different angles relative to one another.

Pad holder 200 may include a mounting flange 218, which may extend radially outward from body 202. Mounting flange 218 may be disposed at different points along a length of body 202. For example, as illustrated mounting flange 218 is disposed at second end 206 of body 202, with a rear surface of mounting flange 218 being coplanar with a surface of second end 206 of body 202 and with first end 204 protruding away from mounting flange 218. In other embodiments, mounting flange 218 may be disposed at a medial portion of body 202, with both first end 204 and second end 206 of body 202 protruding away from mounting flange 218. Mounting flange 218 may be used to secure pad holder 200 to a holder mount, such as holder mount 135. For example, one or more clamps, fasteners, and/or other coupling mechanisms may be interfaced with mounting flange 218 to secure pad holder 200 to a holder mount. In the illustrated embodiment, mounting flange 218 defines a number of fastener apertures 220 that extend through a full thickness of mounting flange 218. Fastener apertures 220 may each receive a fastener, such as a bolt or screw, that secures pad holder 200 to a holder mount. In some embodiments, fastener apertures 220 may have a constant diameter along a length of the fastener aperture 220, while in other embodiments each fastener aperture 220 may include a counterbore or countersink that enables a head of the fastener to sit flush or recessed relative to an external surface of mounting flange 218. While shown with four fastener apertures 220, mounting flange 218 may include any number of fastener apertures 220 in various embodiments. For example, In some embodiments, mounting flange 218 may have a same cross-sectional shape as body 202. For example, mounting flange 218 may have a generally rectangular cross-sectional shape in some embodiments. In other embodiments, mounting flange 218 may have a different shape from body 202.

Pad holder 200 may include a fluid fitting 222 that may be coupled with inlet 212 of fluid lumen 210. For example, in the illustrated embodiment fluid fitting 222 is disposed on second end 206 of body 202. Fluid fitting 222 may provide a location for a cleaning fluid line, such as cleaning fluid line 150, to be interfaced with pad holder 200. Cleaning fluid delivered to pad holder 200 via fluid fitting 222 may pass through fluid lumen 210 and be delivered into channel 224, where the cleaning fluid may contact and/or saturate a rear surface of a cleaning pad affixed to pad holder 200. In some embodiments, fluid lumen 210 and fluid fitting 222 may be sized (e.g., cross-sectional area and/or diameter) to be able to deliver a predefined flow rate of the cleaning fluid to the rear surface of a cleaning pad. For example, fluid lumen 210 and fluid fitting 222 may be sized to deliver cleaning fluid at rates of between about 3 mL/min and 1000 mL/min, between 100 mL/min and 800 mL/min, or between 200 mL/min and 600 mL/min. To achieve a desired flow rate, fluid lumen 210 may have a minimum diameter (or equivalent cross-sectional area) of at least 2 mm, at least 3 mm, at least 4 mm, at least 5 mm, at least 10 mm, or more. For example, the diameter (or equivalent cross-sectional area) of fluid lumen 210 may be between about 2 mm and 25 mm, between about 5 mm and 20 mm, or between about 10 mm and 15 mm, although other values are possible in various embodiments. While illustrated with fluid lumen 210 having a diameter that at least substantially matches a width of channel 224, it will be appreciated that in some embodiments fluid lumen 210 may have a diameter that is less than a width of channel 224.

Figure 3:
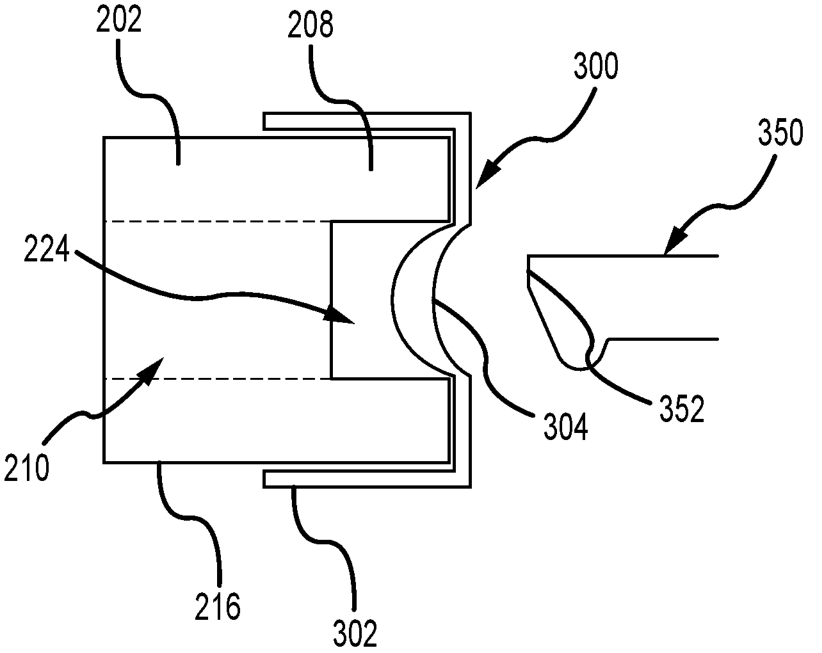
FIG. 3 shows a partial side elevation view of cleaning pad disposed on the pad holder of FIG. 2A according to some embodiments of the present technology.

FIG. 3 shows a partial view of a cleaning pad 300 positioned over first end 204 of pad holder 200, with ends 302 of cleaning pad 300 each being folded over one of the prongs 208 and positioned against opposing faces of lateral surface 216. A medial portion 304 of cleaning pad 300 may be suspended over channel 224. In some embodiments, cleaning pad 300 may be suspended taut above channel 224, while in other embodiments cleaning pad 300 may be suspended above channel 224 with some amount of slack. Cleaning pad 300 may be flexible and/or stretchable. During cleaning operations, an inner edge 352 of a seal 350 (which may be similar to seal 175) may be inserted within channel 224, which may cause medial portion 304 to deform inward into channel 224. Deformation of cleaning pad 300 may enable cleaning pad 300 to conform to a shape of inner edge 352 of seal 350 to enable cleaning pad 300 to clean an entire surface of inner edge 352 of seal 350.

Figure 4:
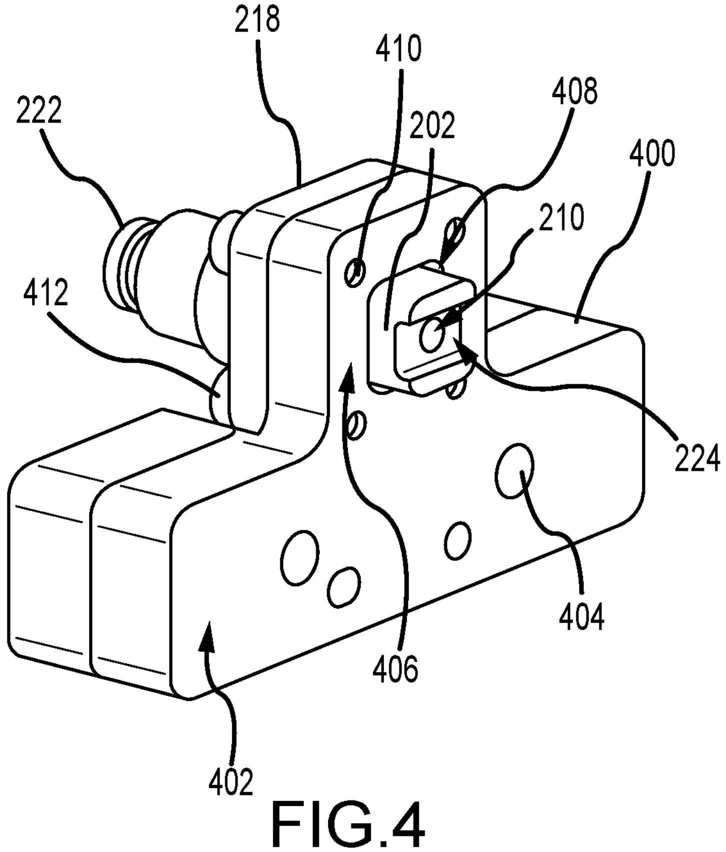
FIG. 4 shows a schematic isometric view of an exemplary holder mount coupled with the pad holder of FIG. 2A according to some embodiments of the present technology.

FIG. 4 illustrates pad holder 200 secured within a holder mount 400. Holder mount 400 may be similar to holder mount 135 and may be used to couple pad holder 200 with a tool arm, such as tool arm 125. Holder mount 400 may include a mounting portion 402 that may be coupled with a tool arm. For example, mounting portion 402 may define a number of apertures 404 that may receive fasteners (not shown) that may be used to secure holder mount 400 (and pad holder 200) to a portion of the tool arm, such as an actuator similar to motor 120. Holder mount 400 may include a receiving portion 406 that may protrude laterally from mounting portion 402. Receiving portion 406 may define an aperture 408 that is sized and shaped to receive body 202 of pad holder 200. For example, in the illustrated embodiment aperture 408 is generally rectangular shaped and may have substantially the same cross-sectional size as body 202 of pad holder 200. To accommodate body 202 of pad holder 200, aperture 408 may be slightly larger than body 202. For example, aperture 408 may be at least 0.1% larger than body 202, at least 0.5% larger than body 202, at least 1% larger than body, or more.

In some embodiments, a cleaning pad, such as cleaning pad 300, may be secured to pad holder 200 by compressing the cleaning pad between a wall defining aperture 408 and an outer surface (e.g., lateral surface 216) of body 202. In such embodiments, a gap formed between the wall defining aperture 408 and lateral surface 216 of body 202 may be less than 0.5 mm, less than 0.4 mm, less than 0.3 mm, less than 0.2 mm, or less than 0.1 mm. Such a small gap may ensure that ends of the cleaning pad may be compressed between lateral surface 216 and the wall defining aperture 408. In some embodiments, to attach the cleaning pad to pad holder 200, the cleaning pad may be positioned over aperture 408, with a medial portion of the cleaning pad being positioned directly over aperture 408 and with ends of the cleaning pad extending over a surface of receiving portion 406 of holder mount 400. First end 204 of body 202 of pad holder 200 may be pressed or otherwise inserted within aperture 408, which may cause ends of the cleaning pad to be compressed between lateral surface 216 and the wall defining aperture 408. First end 204 of body 202 of pad holder 200 may be inserted within aperture 408 until mounting flange 218 contacts a surface of receiving portion 406 of holder mount 400.

Receiving portion 406 of holder mount 400 may include define a number of threaded apertures 410 that are disposed radially outward of aperture 408. Threaded apertures 410 may be disposed in a same arrangement as fastener apertures 220 of pad holder 200. This may enable fasteners 412, such as bolts or screws, to be inserted through fastener apertures 220 and into threaded apertures 410 to secure mounting flange 218 of pad holder 200 against a surface of receiving portion 406 of holder mount 400. In some embodiments, holder mount 400 may be generally T-shaped as illustrated, which may enable mounting portion 402 to be affixed to the tool arm while receiving portion 406 extends away from the tool arm to provide access to fluid fitting 222. This may enable a cooling fluid line to be coupled to fluid fitting 222 to fluidly couple a cleaning fluid source with pad holder 200.

Figure 5:
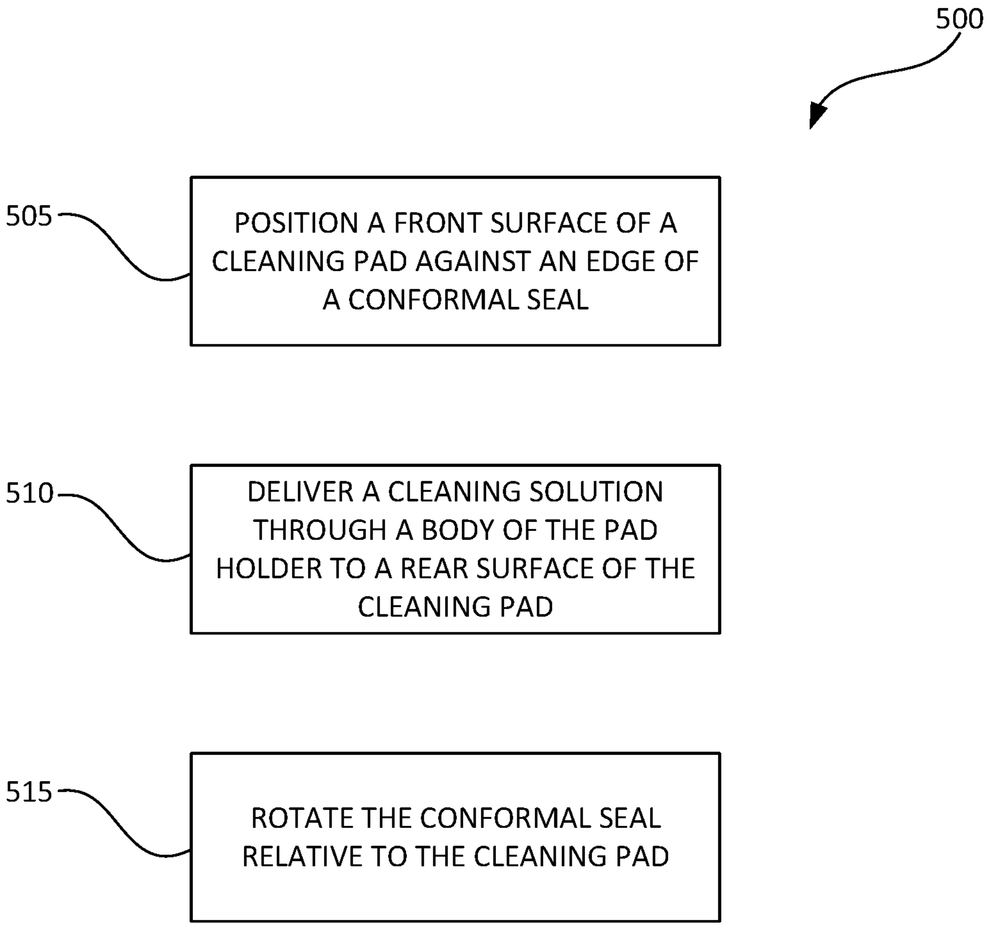
FIG. 5 shows operations of an exemplary method of cleaning a seal according to some embodiments of the present technology.

FIG. 5 shows operations of an exemplary method 500 for cleaning a seal according to some embodiments of the present technology. The method may be performed using a variety of cleaning apparatuses, including cleaning apparatus 100 described above, which may include pad holders according to embodiments of the present technology, such as pad holder 200. Method 500 may include a number of optional operations, which may or may not be specifically associated with some embodiments of methods according to the present technology.

Method 500 may include optional operations prior to initiation of method 500, or the method may include additional operations. For example, method 500 may include operations performed in different orders than illustrated. In some embodiments, method 500 may include positioning a front surface of a cleaning pad against an edge of a seal at operation 505. The cleaning pad may be secured with a pad holder (such as pad holder 200). For example, a tool arm upon which the pad holder is coupled may be maneuvered to a position in which at least a distal end of tool arm is disposed within the interior of the seal. An actuator coupled with the tool arm may be moved to a cleaning position in which the cleaning pad is disposed in vertical alignment with an inner edge of the seal. The tool arm may then be maneuvered laterally to engage the cleaning pad with the inner edge of the seal.

At operation 510, a cleaning solution may be delivered through a body of the pad holder to a rear surface of the cleaning pad. For example, the cleaning solution may be flowed from a cleaning fluid source to the pad holder via one or more cleaning fluid lines. The fluid lines may be coupled with a fluid fitting that is coupled with a fluid fitting that is coupled with the pad holder. The body of the pad holder may define a fluid lumen that is fluidly coupled with the fluid fitting and a channel that is positioned proximate the rear surface of the cleaning pad such that cleaning solution delivered to the fluid fitting is delivered to the rear surface of the cleaning pad. The delivery of the cleaning solution to the rear surface of the cleaning pad may occur before, during, and/or after engagement of the cleaning pad with the inner edge of the seal. In some embodiments, the cleaning solution may include deionized water, although other liquid may be used in various embodiments. In some embodiments, the cleaning solution may be flowed at a flow rate of between 3 mL/min and 1000 mL/min.

At operation 515, the seal may be rotated relative to the cleaning pad. For example, the seal may be positioned atop a rotating support assembly, which may include supports, a rotating plate, and a motor, such as those described in relation to cleaning apparatus 100. The motor may be actuated to rotate the seal relative to the cleaning pad, which may enable the cleaning pad to wipe against and clean an entire circumference of the inner edge of the seal. The rotation of the seal may be performed before, during, and/or after engagement of the cleaning pad with the inner edge of the seal.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a heater" includes a plurality of such heaters, and reference to "the protrusion" includes reference to one or more protrusions and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A pad holder, comprising:
a body comprising a first end and a second end, wherein:
the first end defines a channel that is configured to receive a cleaning pad;
the body defines a fluid lumen having an inlet and an outlet; and
the outlet extends through the channel; and
a fluid fitting coupled with the inlet of the fluid lumen.

2. The pad holder of claim 1, wherein:
the inlet of the fluid lumen extends through the second end of the body.

3. The pad holder of claim 1, wherein:
the first end of the body comprises a first prong and a second prong that are spaced apart by the channel.

4. The pad holder of claim 3, wherein:
the channel extends across an entire width of the first end of the body.

5. The pad holder of claim 1, further comprising:
a mounting flange extending radially outward from the body.

6. The pad holder of claim 5, wherein:
the mounting flange defines a plurality of fastener apertures.

7. The pad holder of claim 6, wherein:
the mounting flange is disposed at the second end of the body.

8. The pad holder of claim 1, wherein:
a diameter of the fluid lumen is at least 2 mm.

9. The pad holder of claim 1, wherein:
the channel is generally U-shaped with at least one of rounded corners or angled corners.

10. The pad holder of claim 1, wherein:
a width of the channel is greater than a thickness of an inner edge of a seal to be inserted therein.

* * * * *